US009317611B2

(12) United States Patent
De Datta et al.

(10) Patent No.: US 9,317,611 B2
(45) Date of Patent: *Apr. 19, 2016

(54) QUERY GENERATION FOR SEARCHABLE CONTENT

(71) Applicant: BloomReach Inc., Mountain View, CA (US)

(72) Inventors: Raj K. De Datta, Palo Alto, CA (US); Ashutosh Garg, Sunnyvale, CA (US); Abhay Vardhan, Redwood City, CA (US); Joshua Levy, Mountain View, CA (US); Srinath Sridhar, Mountain View, CA (US)

(73) Assignee: BloomReach Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,516

(22) Filed: Dec. 10, 2014

(65) Prior Publication Data

US 2015/0169767 A1 Jun. 18, 2015

Related U.S. Application Data

(63) Continuation of application No. 14/167,042, filed on Jan. 29, 2014, now Pat. No. 8,938,452, which is a continuation of application No. 12/571,242, filed on Sep. 30, 2009, now Pat. No. 8,676,798.

(51) Int. Cl.
*G06F 7/02* (2006.01)
*G06F 17/30* (2006.01)

(52) U.S. Cl.
CPC ...... *G06F 17/30864* (2013.01); *G06F 17/3053* (2013.01); *G06F 17/3089* (2013.01)

(58) Field of Classification Search
CPC .......... G06F 17/3053; G06F 17/30864; G06F 17/3089; G06F 17/30
See application file for complete search history.

(56) References Cited

U.S. PATENT DOCUMENTS

| | | | |
|---|---|---|---|
| 2005/0060168 A1* | 3/2005 | Murashige | G06Q 30/02 705/1.1 |
| 2005/0177561 A1* | 8/2005 | Ramanathan | G06F 17/30964 |
| 2007/0192293 A1* | 8/2007 | Swen | 707/3 |
| 2008/0104061 A1* | 5/2008 | Rezaei | 707/5 |
| 2013/0239212 A1* | 9/2013 | Bennett | 726/22 |

* cited by examiner

*Primary Examiner* — Bruce Moser
(74) *Attorney, Agent, or Firm* — Van Pelt, Yi & James LLP

(57) ABSTRACT

Query generation for searchable content is provided. In some embodiments, query generation for searchable content includes receiving searchable content (e.g., the searchable content can include a unique identifier for the searchable content, such as a Uniform Resource Locator (URL) for a web site, and the web site can include one or more web pages); and generating a set of queries, the set of queries including one or more queries (e.g., the set of queries can include ranked queries) that are relevant to the searchable content.

38 Claims, 7 Drawing Sheets

QUERY GENERATION FOR SEARCHABLE CONTENT

CROSS REFERENCE TO OTHER APPLICATIONS

This application is a continuation of co-pending U.S. patent application Ser. No. 14/167,042, entitled QUERY GENERATION FOR SEARCHABLE CONTENT filed Jan. 29, 2014, which is a continuation of U.S. patent application Ser. No. 12/571,242, now U.S. Pat. No. 8,676,798, entitled QUERY GENERATION FOR SEARCHABLE CONTENT filed Sep. 30, 2009, both of which are incorporated herein by reference for all purposes.

BACKGROUND OF THE INVENTION

Search engines (e.g., web based search engines provided by various vendors, including, for example, Google, Microsoft's Bing, and Yahoo) provide for searches of online information that includes searchable content (e.g., digitally stored electronic data), such as searchable content available via the World Wide Web (WWW). As input, a search engine typically receives a search query (e.g., query input including one or more terms, such as keywords, by a user of the search engine). The search engine performs the search for the search query and outputs results that are typically presented in a ranked list, often referred to as search results or hits (e.g., links or Uniform Resource Locators (URLs) for one or more web pages and/or web sites). The search results can include web pages, images, audio, video, database results, directory results, information and other types of data.

Search engines typically provide paid search results (e.g., the first three results in the main listing and/or results often presented in a separate listing on the right side of the output screen). For example, advertisers may pay for placement in such paid search results based on keywords (e.g., keywords in search queries). Search engines also typically provide organic search results, also referred to as natural search results. Organic search results are based on various algorithms employed by different search engines that attempt to provide relevant search results based on a received search query.

For improved Internet marketing, search engine optimization (SEO) has developed as a form of industry/technical consulting (often referred to as search engine optimizers) provided to web site operators (e.g., vendors of products/services with web sites and/or e-commerce vendors of products/services) for improving the volume or quality of traffic to a web site from a search engine via organic search results (e.g., to improve the web site's web presence as a paid service engagement or pursuant to a marketing campaign). Generally, the higher a web site appears in the organic search results list, the more users it will receive from the search engine. SEO can target different kinds of search, including image search, local search, and industry specific, vertical search engines to improve the web site's web presence. For example, SEO often considers how search engines work and what people search for to recommend web site related changes to optimize a website (e.g., which primarily involves editing its content and HyperText Markup Language (HTML) coding to both increase its relevance to specific keywords and to remove barriers to the indexing activities of search engines).

BRIEF DESCRIPTION OF THE DRAWINGS

Various embodiments are disclosed in the following detailed description and the accompanying drawings.

DETAILED DESCRIPTION

Figure 1:
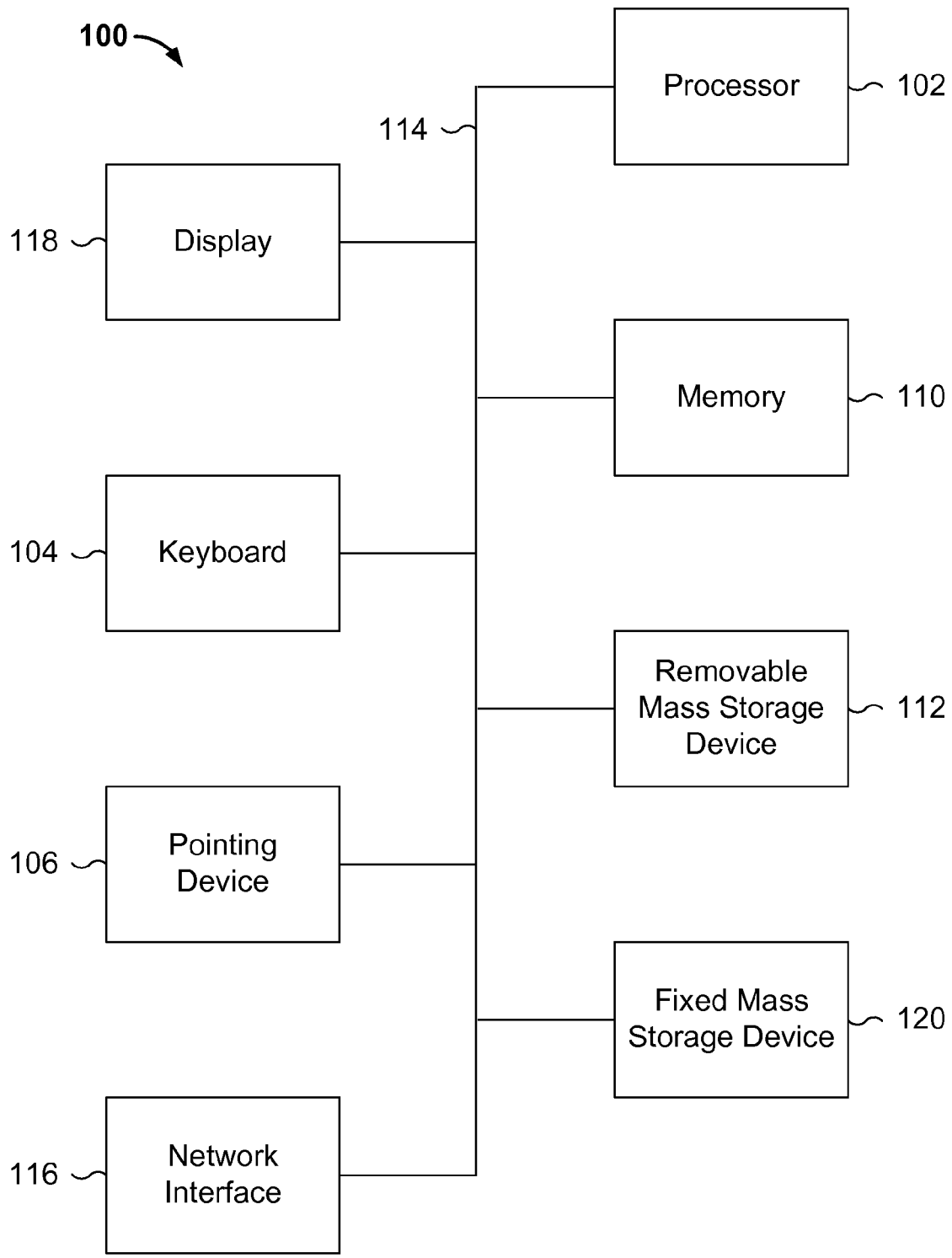
FIG. 1 is a functional diagram illustrating a programmed computer system for executing query generation for searchable content in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

For improved Internet marketing, search engine optimization (SEO) generally relies on search engine optimizers to assist web site operators in improving the volume or quality of traffic to a web site from a search engine via organic search results (e.g., to improve the web site's web presence as a paid service engagement or pursuant to a marketing campaign). Generally, the higher a web site appears in the organic search results list, the more users it will receive from the search engine, and typically appearing higher in the organic search results list is more important than the paid search results for improving web presence. However, such SEO approaches are generally based on industry/technical consulting engagements that must be paid for with each engagement for the term of the engagement. Moreover, SEO approaches are generally based on proprietary, undisclosed practices used by SEO consultants that are not automated computer implemented processes and cannot automatically adapt to, for example, new searchable content, competitive searchable content, and/or search engine algorithm changes.

What is needed is query generation for searchable content. In some embodiments, query generation for searchable content (e.g., an inverse search engine) is provided. In some embodiments, query generation for searchable content includes receiving searchable content (e.g., the searchable content can include a unique identifier for the searchable content, such as a Uniform Resource Locator (URL) for a web site on the World Wide Web (WWW), and the web site can include one or more web pages); and generating a set of queries (e.g., generating queries using query modeling), the set of queries including one or more queries (e.g., the set of queries can include ranked queries) that are relevant to the searchable content. In some embodiments, the queries are ranked based on a score determined for each query of the set of ranked queries. In some embodiments, an inverse search engine for query generation for searchable content is provided, in which the searchable content is received as an input, and the set of ranked queries is provided as an output. Moreover, unlike SEO approaches, query generation for searchable content provides, in some embodiments, an automated computer implemented process that can automatically adapt to, for example, new searchable content, competitive searchable content, and/or search engine algorithm changes.

Query generation for searchable content can be used for various applications and purposes. For example, query generation for searchable content can be used for search engine optimization (SEO) to optimize a web site or any other searchable content for organic search (e.g., populating the set of queries, or a subset of the ranked queries, in a widget or in a dynamically generated/populated widget on a one or more HTML pages of a web site). For example, using these techniques can solve the problem for a web site owner in which competitor web sites are winning certain queries for which the web site owner should be better on as their web site has the more responsive content for such queries.

As another example, query generation for searchable content can be used for search engine marketing (SEM) to identify and compete for keywords identified as keywords in the generated queries for the searchable content (e.g., to buy keywords for search engine marketing). Those of ordinary skill in the art will appreciate that there are many other applications and purposes for query generation for searchable content.

FIG. 1 is a functional diagram illustrating a programmed computer system for executing query generation for searchable content (e.g., a web site) in accordance with some embodiments. As shown, FIG. 1 provides a functional diagram of a general purpose computer system programmed to perform query generation for searchable content in accordance with some embodiments. As will be apparent, other computer system architectures and configurations can be used to perform context sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide the various computer/computer implemented functional elements described below with respect to FIGS. 2 through 4 and/or executes/performs the processes described below with respect to FIGS. 5 through 7.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
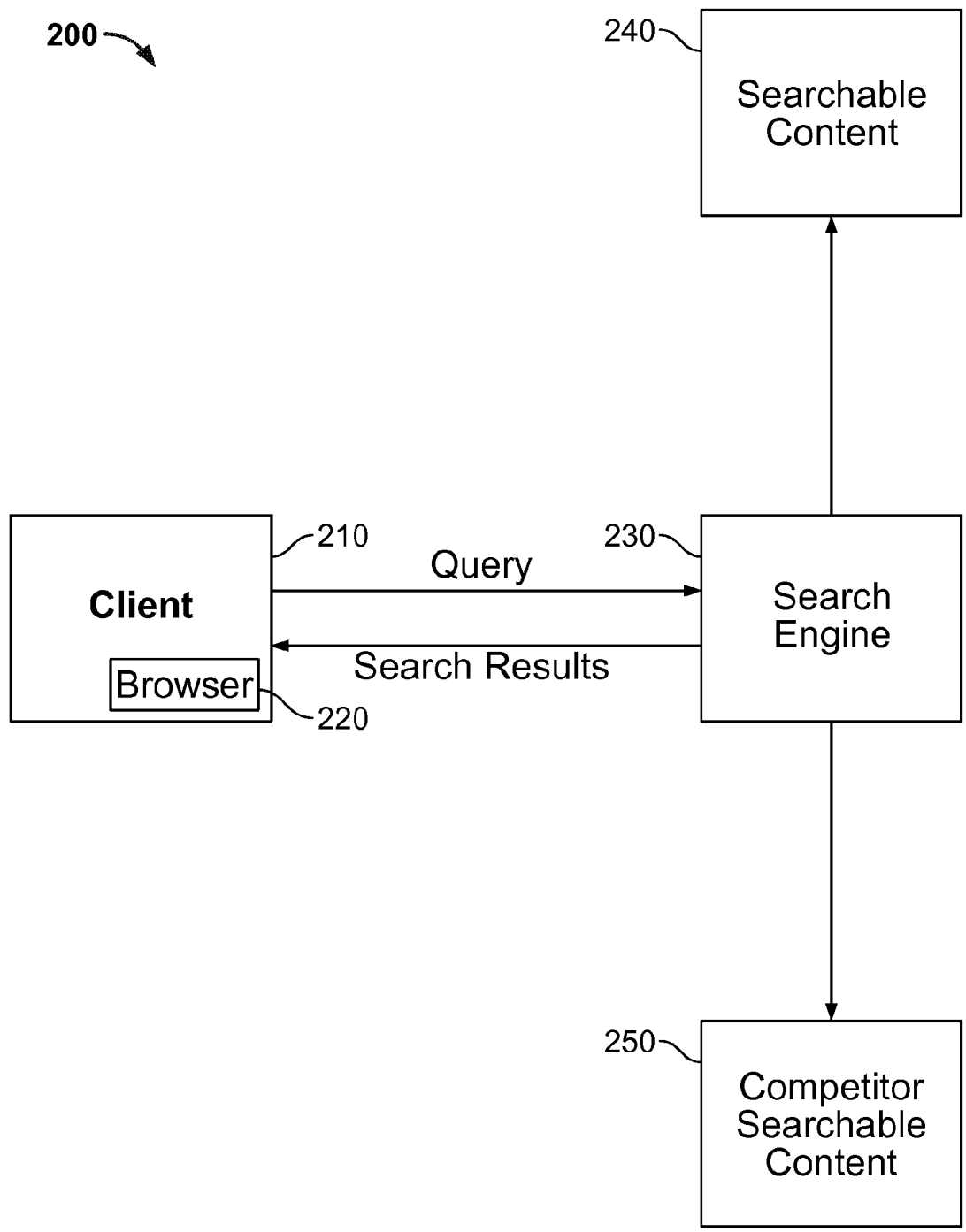
FIG. 2 is a block diagram illustrating network based search in accordance with some embodiments.

FIG. 2 is a block diagram illustrating network based search in accordance with some embodiments. For example, the Internet and, in particular, the World Wide Web (WWW), includes searchable content located on various computers, servers, and network appliances (e.g., web servers/appliances). Web browsers, such as web browser 220, provide client software executed on a computer, such as client 210, for accessing searchable content (e.g., web pages) on the WWW, such as searchable content provided by a server 240 (e.g., Nike's web site) and/or competitor searchable content provided by a server 250 (e.g., Adidas' web site). As shown in FIG. 2, the client computer 210 submits a query to the search engine 230 and receives search results back from the search engine 230 (e.g., Google's search engine, Yahoo' search engine, Microsoft's Bing search engine, or another search engine). The search engine 230 provides search results based on the query received from the client 210. The search engine 230 typically crawls various searchable content on the network, (e.g., the WWW) including searchable content 240 and 250 to identify relevant searchable content (e.g., to update an index of available searchable content). The search engine 230 typically provides natural or organic search results based on the query and, in some cases, can also provide paid search results (e.g., based on paid keywords in the query submitted by the client 210 or based on other techniques). As will be appreciated by those of ordinary skill in the art, various network architectures and software/computing solutions are available for providing network based search. In some embodiments, query generation for searchable content can be used, for example, by a web site operator providing searchable content 240 by populating the set of queries, or a subset of the ranked queries, in a widget or in a dynamically generated/populated widget on a one or more HTML pages of the web site providing the searchable content 240.

Figure 3:
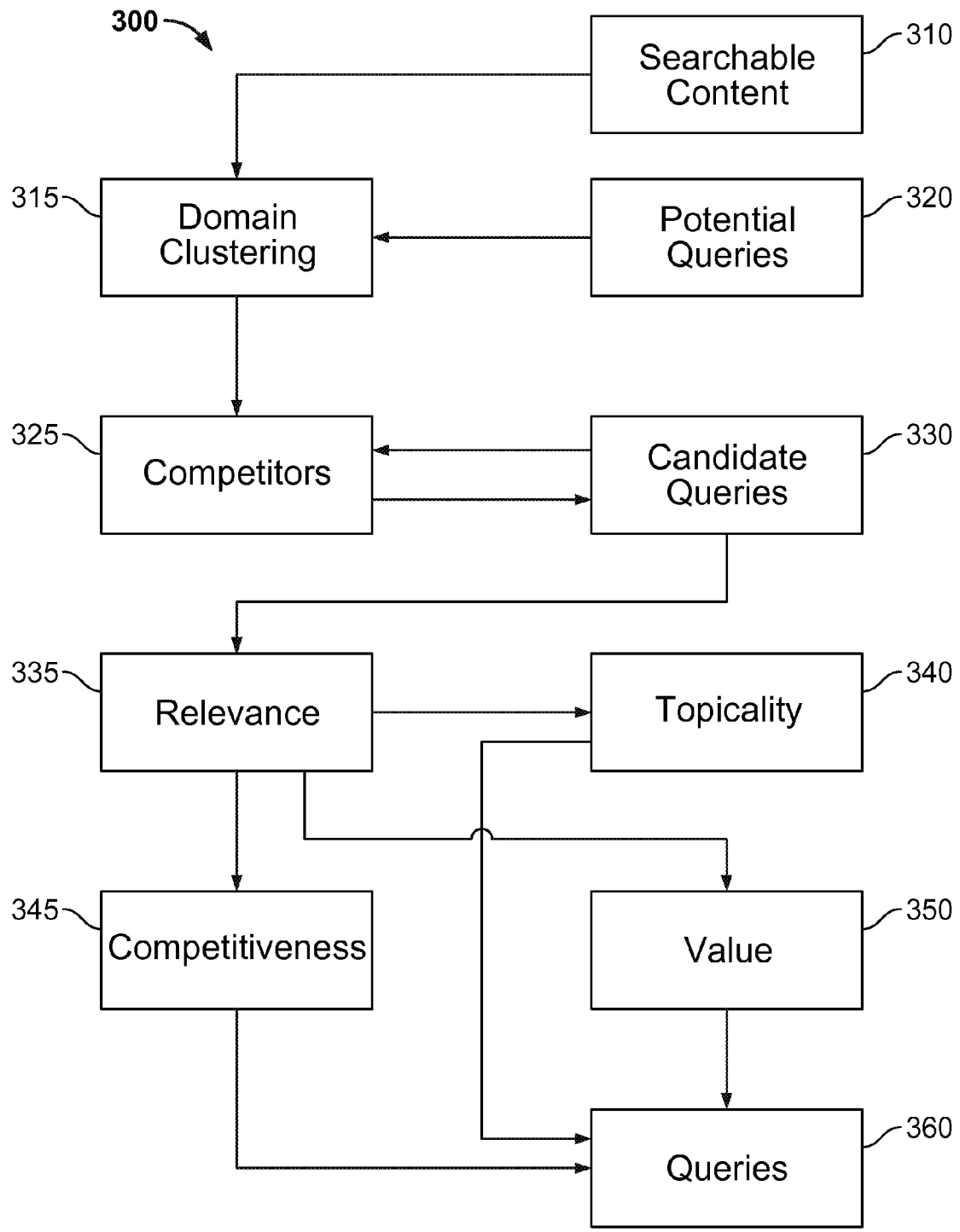
FIG. 3 is a functional diagram for query generation for searchable content in accordance with some embodiments.

FIG. 3 is a functional diagram for query generation for searchable content in accordance with some embodiments. In some embodiments, query generation for searchable content (e.g., an inverse search engine is provided). In some embodiments, searchable content is provided (e.g., one or more web pages and/or other searchable content) as input, potential queries are analyzed for the searchable content using one or more of the various techniques as described herein and/or similar techniques as will be apparent to those of ordinary skill in the art in view of the embodiments disclosed herein, and a set of queries for the searchable content is provided as output. In some embodiments, the output set of queries include ranked queries for the searchable content.

As shown in FIG. 3, potential queries 320 are provided as input to the domain clustering 315. For example, potential queries 320 provides a set of top queries (e.g., the top 10, 20, 100, or 1000, etc., queries) or top weighted/scored queries (e.g., based on a threshold score/weight criteria). In some embodiments, potential queries 320 provides the potential queries by querying logs of one or more search engines (e.g., web logs of one or more search engines) to identify potential web queries. In some embodiments, potential queries 320 provide the potential queries based on the anchors of the searchable content, based on popular interesting phrases (e.g., using term frequency-inverse document frequency (tf-idf) techniques and/or other techniques). For example, terms in the phrase can be analyzed based on popularity modified by interestingness of the terms in the phrase (e.g., rarity of the terms in documents, popularity of the terms in queries and anchors, and/or pair wise interdependence of the terms based on an association rule). In some embodiments, suggest data techniques are used to provide potential queries (e.g., using the Google search engine's suggest output for certain terms). In some embodiments, a query language model is used to provide potential queries. There are various approaches to using query language model techniques and/or other techniques to determine potential queries as will be appreciated by those of ordinary skill in the art. In some embodiments, domain clustering 315 assigns a domain to the potential queries, which can then be used to determine a set of candidate queries that are a subset of the potential queries based on the domain determined for the searchable content, as further described below.

As shown in FIG. 3, domain clustering 315 also receives searchable content 310 as input. Domain clustering 315 determines a domain for the searchable content. For example, Nike can be assigned to a sports shopping domain, and Nordstrom can be assigned to a clothes shopping domain. In some embodiments, domain clustering 315 clusters domains of searchable content. For example, domain clustering can be performed based on a concurrence of web domains using association rules, hashing algorithms, and/or other techniques. In some embodiments, fast algorithms for mining association rules are used as will be appreciated by those of ordinary skill in the art. In some embodiments, clustering is performed based on web site content (e.g., using a hashing algorithm, such as minhash or other algorithms). In some embodiments, a history of web sites visited by user(s) can be used for clustering (e.g., based on a toolbar, ISP, and/or cookie for monitoring and tracking visited web sites).

As shown in FIG. 3, candidate queries 330 are provided as input to competitors 325, and candidate queries 330 also receives input from competitors 325. In some embodiments, candidate queries 330 can determine how the searchable content ranks relative to its competitors (e.g., competitors to the provider of the searchable content for that domain, such as Nike's web site's ranking for organic search relative to Adidas). For example, determining whether the searchable content (e.g., web site) includes an anchor and title that match can be used to analyze the searchable content. In some embodiments, the queries for which the searchable content performs well relative to competitor searchable content can be filtered and/or disregarded for various applications (e.g., SEO applications). In some embodiments, candidate queries are generated using a query language model/query model. In some embodiments, an N-gram model is used to model the query language. For example, using query model techniques can determine that "digital camera" is a good query, but "is digital camera" is not a good query. In particular, given a candidate phrase ph, P(ph/Q-model) provides a computation of the candidate phrase ph, where Q-model is the N-gram model (e.g., the N-gram frequency counts). In some embodiments, if this probability is above a certain threshold, then the phrase ph is determined to be a potential query.

As shown in FIG. 3, candidate queries 330 are also provided as input to relevance 335. In some embodiments, relevance 335 provides a matching web page (e.g., a best matching static, non-dynamically generated web page on the web site). In some embodiments, this process is performed periodically (e.g., as web pages age, as content is modified, added/deleted over time). In some embodiments, the search result page from the web site is obtained, and then evaluated, for example, based on search relevance (e.g., for SEO purposes, determined if search engines would rank this web page highly for a given query). Various techniques can be utilized for determining a search relevance score. For example, for a given web page, let Score(P, Q), that is a function S(P,Q) is the search relevance score for the query Q for the page P. In some embodiments, S(P,Q) can be computed using the following function(s): S(P,Q)=Function(T(P,Q), B(P,Q), H(P,Q), L(P, Q)), in which this function provides a weighted linear combination (e.g., evolving weighted assignments based on search engine changes/evolution(s)), where T(P,Q) is the Title (T) score for web page P and query Q (e.g., based on how many terms of the query are present in the Title of the web page and/or any other criteria/techniques), where B(P,Q) is the Body(B) score for web page P and query Q (e.g., based on how many terms of the query are present in the Body and/or any other criteria/techniques), where H(P,Q) is the Heading (H) tag score for web page P and query Q (e.g., based on how many terms of the query are in the Heading and/or any other criteria/techniques), and where L(P,Q) is the Linktext(L) score for web page P and query Q (e.g., based on how many terms of the query are present in the Linktext and/or any other criteria/techniques).

In some embodiments, each of these functions are computed by taking into account the overlap between the content of the query and the content of the corresponding tag on the page. In some embodiments, F is then a function that is used to combine these scores to provide a computed overall score. In some embodiments, F is a weighted linear combination function (e.g., each of these scores is assigned a weight and linearly combined/added to provide a computed score/value that accounts for each of these scores attributing to the computed score/value).

In some embodiments, if the computed score exceeds a certain threshold (e.g., a threshold value), then the page is determined to be relevant for search engines for the candidate query. Otherwise (e.g., the computed score does not exceed the threshold), the page is not considered relevant for search engines for the candidate query. In some embodiments, the threshold is computed by analyzing the scores of results retrieved by the search engine for the same candidate query.

In some embodiments, content relevance (e.g., for user purposes, does this page have the relevant content) for a candidate query, get the search result page from the merchant's site. Given that the incoming page itself is a search result page, each result is evaluated and presented on the page to determine if this is a relevant query for this page or not. For example, this technique can be used when merchants tend to provide results even if there is not a relevant match to the requested query. In some embodiments, a filtered list of queries is then provided using one or more of these techniques.

As shown in FIG. 3, relevance 335 is provided as input to topicality 340. In some embodiments, topicality is applicable to SEM and/or SEO applications/purposes. For example, the query including the term "trees" can be relevant to OSH (Orchard Supply Hardware) and Michael's Art Supply, but trees can be deemed to be more topical to OSH in the Summer and more topical to Michael's Art Supply in the Winter (e.g., Holiday tree supplies). In some embodiments, various techniques are used to determine the topicality, such as popular meaning. For example, the popular meaning of a query can be determined by using a technique to get content for the query using a search engine (e.g., Google search, Yahoo search, Microsoft's Bing search, or any search engine under consideration). For example, a search for Apple may suggest computer as Apple computer is a popular meaning/popular search query. In some embodiments, topicality analysis includes determining a local meaning. For example, determining the local meaning can include determining the most relevant page from the web site for the query (e.g., Apple tree for OSH) for a query including the term "Apple". In some embodiments, topicality analysis further includes determining how different the local meaning is from the global or popular meaning. If the local meaning and the global or popular meaning are very different, then topicality is determined to be low (e.g., poor). In some embodiments, topicality includes determining the most clicked page for the query. In some embodiments, topicality includes analyzing the web site/searchable content for one or more competitors, and determining how many are advertising or showing information in search results for this query.

As shown in FIG. 3, relevance 335 is provided as input to competitiveness 345. In some embodiments, competitiveness 345 determines a link or rank, such as a page rank (e.g., an actual or proximate range of page rank) and/or a domain rank. For example, competitiveness 345 can determine a number of back links and/or quality, quality of back links (e.g., based on their relative rank, as discussed above). In some embodiments, competitiveness 345 also determines a relevance, such as the average relevance of, for example, the top ten/ranked results, such as using a function g(y).

In some embodiments, relevance 335 is based on a link structure. In some embodiments, relevance 335 is based on the content of the web page. In some embodiments, relevance 335 is based on a combination of a link structure and the content of the web page. In some embodiments, a page rank of other pages that are present in search results is computed, which can then be used to determine if the page (for a query) will be less or more competitive. In some embodiments, a topic relevance of the page is computed and the computed topic relevance is compared to the topic relevance of other pages that, for example, appear in a top tier (e.g., top 10)

search results in a search engine (e.g., Google, Yahoo, Microsoft Bing, or other search engines). These are various techniques, which can be performed individually or in various combinations, that can be used to determine how competitive this web page is compared to other pages for this query.

As shown in FIG. 3, relevance 335 is also provided as input to value 345. In some embodiments, value 345 determines a query volume for the candidate query. In some embodiments, value 345 determines a cost per click (CPC) value for the candidate query. In some embodiments, value 345 determines a conversion rate for the candidate query. In some embodiments, value 345 determines an anti-value (e.g., negative references, etc.) for the candidate query.

As shown in FIG. 3, topicality 340, competiveness 345, and value 350 are provided as input to the queries function 360. In some embodiments, other functions are provided as input to the queries function 360 using various techniques. In some embodiments, queries function 360 provides the queries generated for the searchable content, in which, in some embodiments, the queries output are a subset of the candidate queries and can also be ranked, using some or all of the above described techniques or using other similar techniques as will be apparent to one of ordinary skill in the art.

Figure 4:
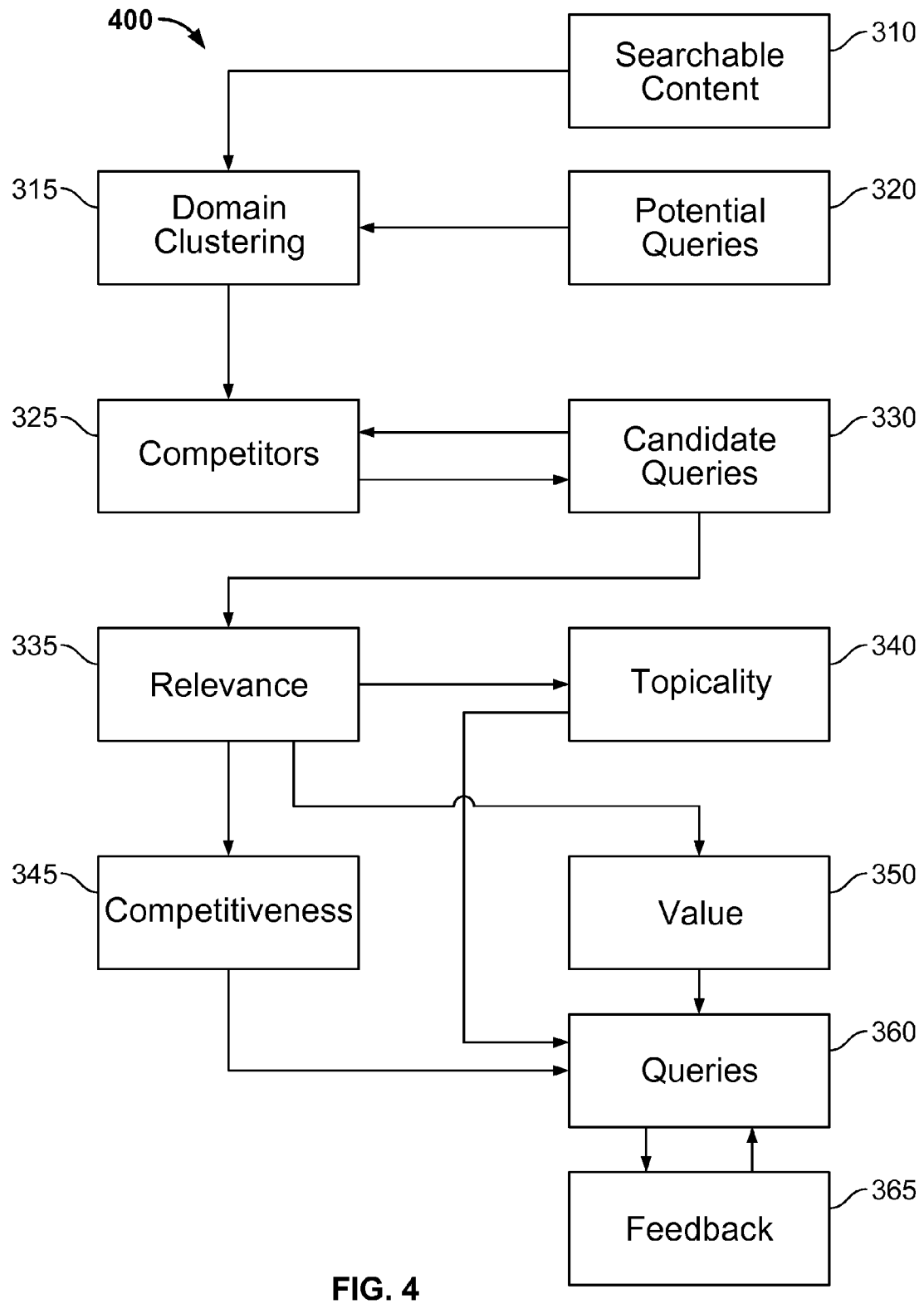
FIG. 4 is another functional diagram for query generation for searchable content in accordance with some embodiments.

FIG. 4 is another functional diagram for query generation for searchable content in accordance with some embodiments. FIG. 4 is similar to FIG. 3 except functional diagram 400 for providing query generation for searchable content includes a feedback function 365. As shown in FIG. 4, feedback 365 provides a feedback loop to the query generation for searchable content 400. In some embodiments, whether the page is showing up in the results query and/or whether click through/conversion rates are improved are types of feedback mechanisms that can be provided by feedback function 365. For example, a click thru from a Google search shows a referral page based on the Google search query, in which efficacy, clicks and quality of clicks (e.g., conversion and/or time on site determined, for example, by using a probe sending periodic signals via a JavaScript or other mechanism). Those of ordinary skill in the art will appreciate that various other feedback mechanisms can be provided for query generation for searchable content 400.

Figure 5:
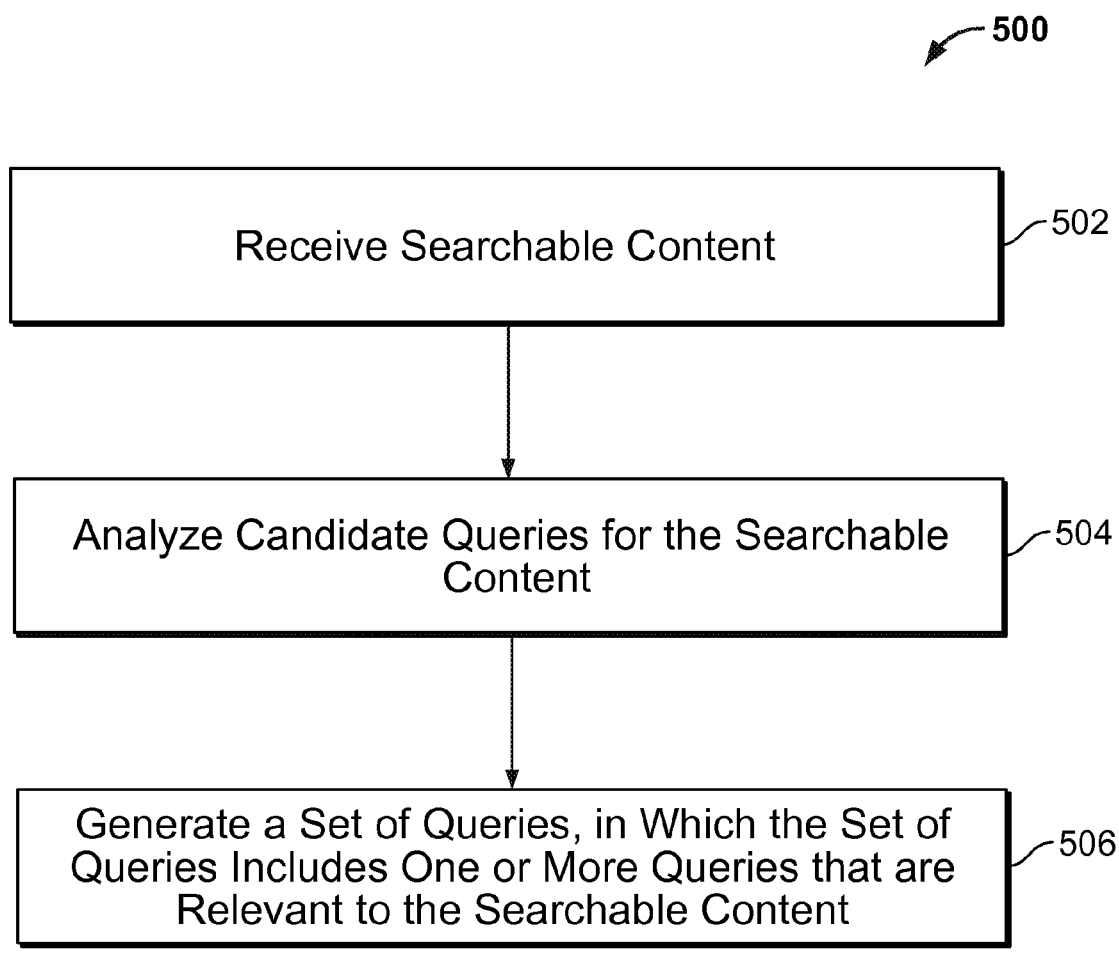
FIG. 5 illustrates a flow diagram for query generation for searchable content in accordance with some embodiments.

FIG. 5 illustrates a flow diagram for query generation for searchable content in accordance with some embodiments. At 502, searchable content (e.g., one or more web pages and/or other searchable content) is received. At 504, candidate queries for the searchable content are analyzed. At 506, a set of queries is generated, in which the set of queries includes one or more queries that are relevant to the searchable content. In some embodiments, the set of queries includes one or more queries that are ranked.

Figure 6:
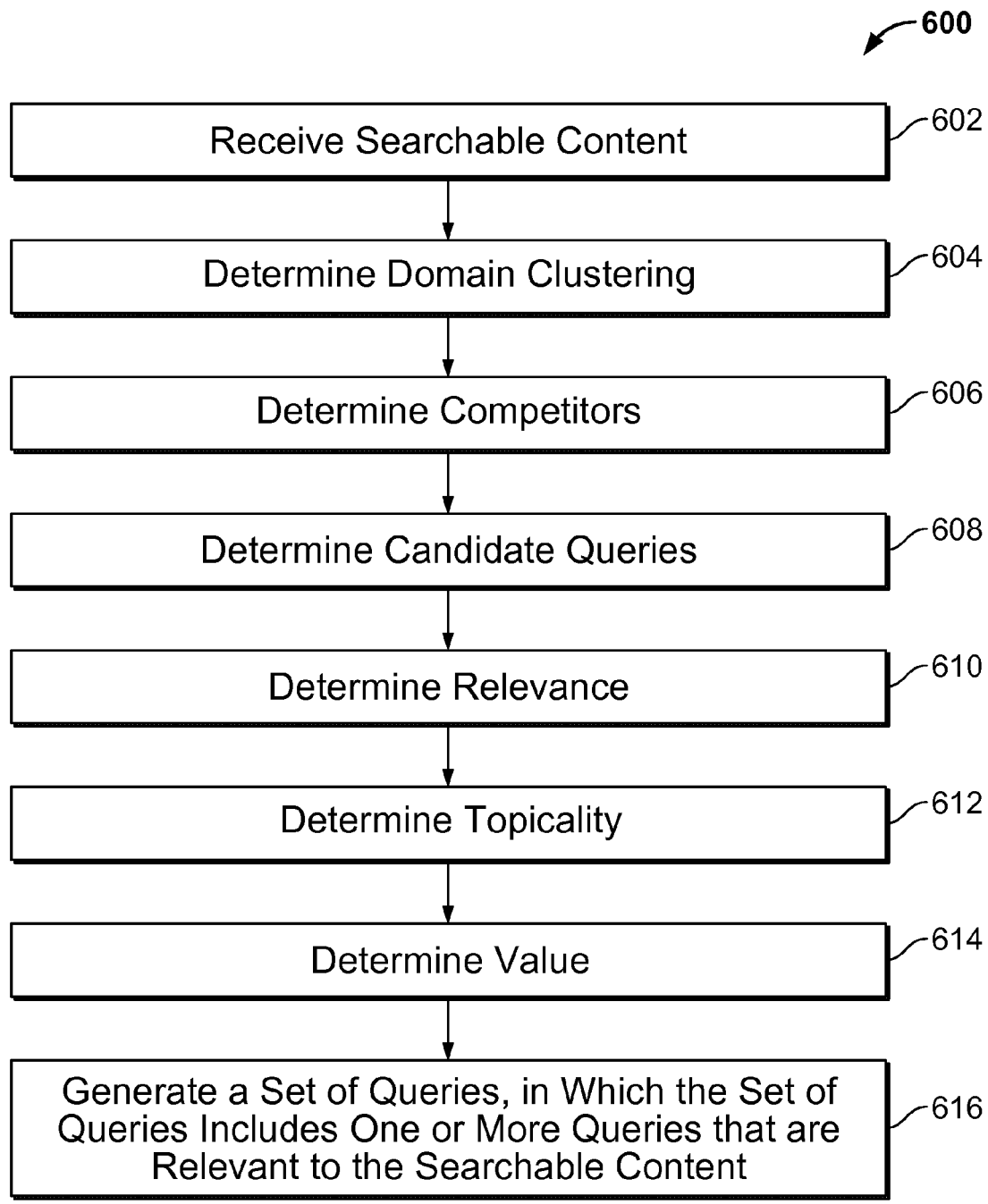
FIG. 6 illustrates another flow diagram for query generation for searchable content in accordance with some embodiments.

FIG. 6 illustrates another flow diagram 600 for query generation for searchable content in accordance with some embodiments. At 602, searchable content is received. At 604, domain clustering is determined. At 606, competitors for the searchable content are determined. At 608, candidate queries for the searchable content are determined. In some embodiments, the candidate queries are a subset of received potential queries that are subset based on a determined domain clustering for the searchable content, as similarly described above. At 610, relevance of the candidate queries for the searchable content is determined. At 612, topicality of the candidate queries for the searchable content is determined. At 614, a value is determined for each of the candidate queries for the searchable content. At 616, a set of queries is generated, in which the set of queries includes one or more queries that are relevant to the searchable content. In some embodiments, the set of queries includes one or more queries that are ranked.

Figure 7:
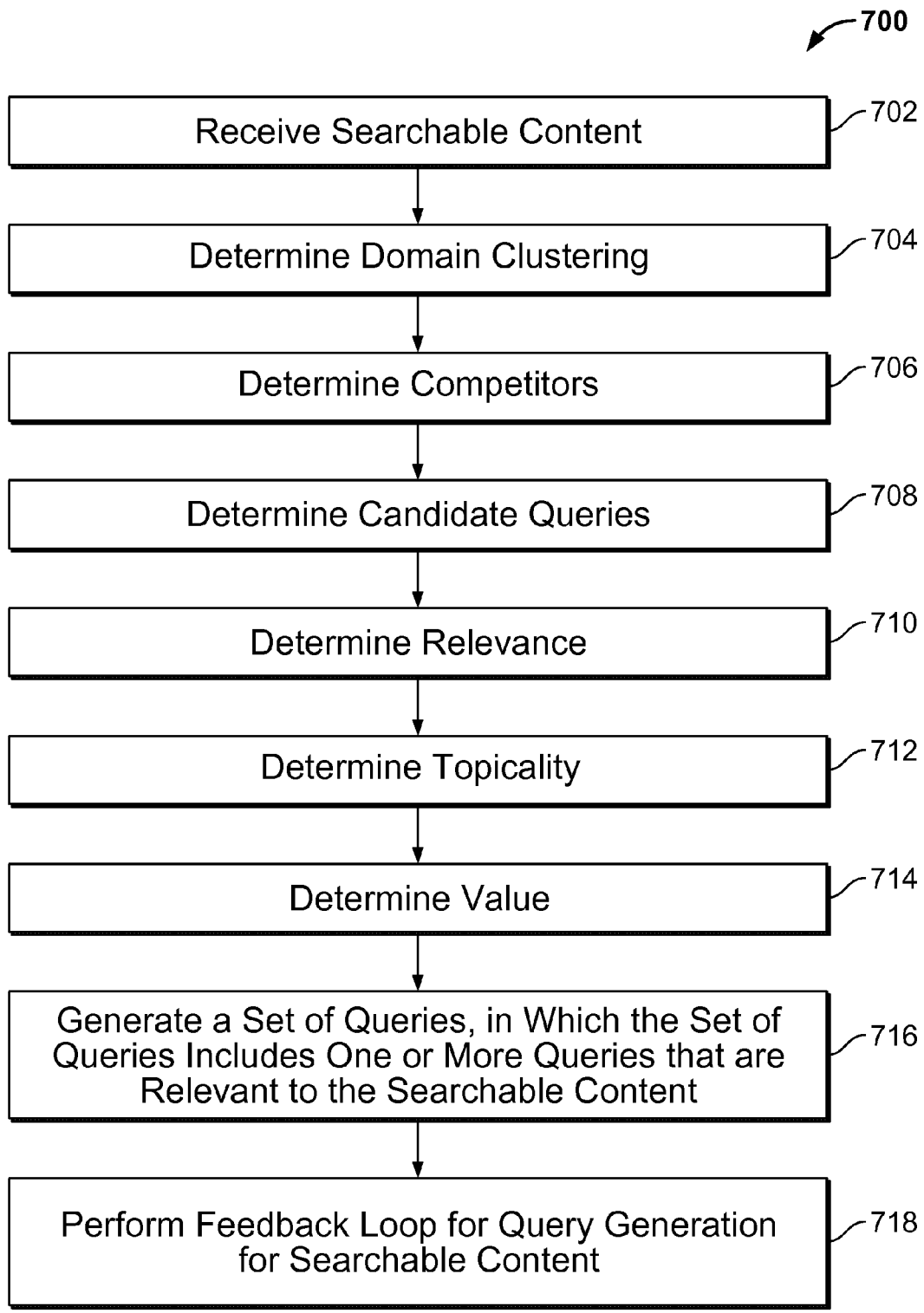
FIG. 7 illustrates another flow diagram for query generation for searchable content in accordance with some embodiments.

FIG. 7 illustrates another flow diagram 700 for query generation for searchable content in accordance with some embodiments. FIG. 7 is similar to FIG. 6 except that flow diagram 700 includes a feedback loop 718. In particular, at 702, searchable content is received. At 704, domain clustering is determined for the searchable content. At 706, competitors for the searchable content are determined. At 708, candidate queries for the searchable content are determined. In some embodiments, the candidate queries are a subset of received potential queries that are subset based on a determined domain clustering for the searchable content, as similarly described above. At 710, relevance of the candidate queries for the searchable content is determined. At 712, topicality of the candidate queries for the searchable content is determined. At 714, a value is determined for each of the candidate queries for the searchable content is determined. At 716, a set of queries is generated, in which the set of queries includes one or more queries that are relevant to the searchable content. In some embodiments, the set of queries includes one or more queries that are ranked. At 718, a feedback loop is performed for query generation for searchable content. For example, a feedback loop can be performed as similarly described herein with respect to FIG. 4.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of query generation for searchable content, comprising:

receiving an identifier for a web site comprising searchable content, wherein the searchable content includes one or more web pages of the web site, and wherein the web site is to be modified for higher rankings in organic search results of a search engine;

generating a set of queries for the web site using an inverse search engine executed on a processor, wherein the generated set of queries includes one or more queries that are relevant to the searchable content of the web site, wherein the generating the set of queries comprises:
  determining candidate queries for the searchable content of the web site; and
  determining a relevance for each of the candidate queries; and modifying the web site for organic searches using the generated set of queries to generate a modified version of the web site.

2. The method recited in claim 1, wherein the identifier for the web site includes a Uniform Resource Locator (URL) for the web site.

3. The method recited in claim 1, wherein the determining the relevance is based on a number of terms of each candidate query present in a web page of the web site.

4. The method recited in claim 1, wherein the searchable content of the web site is received as an input to the inverse search engine, the generated set of queries includes ranked queries, and the generated set of queries including the ranked queries is provided as an output from the inverse search engine.

5. The method recited in claim 2, further comprising:
performing a feedback loop to determine whether the modified version of the web site is resulting in higher rankings in organic search results of the search engine.

6. The method recited in claim 1, wherein the generating the set of queries further comprises:
   determining a topicality for each of the candidate queries.

7. The method recited in claim 1, wherein the generating the set of queries further comprises:
   determining a topicality for each of the candidate queries, wherein the determining of the topicality for each of the candidate queries comprises:
      determining a local meaning of each of the candidate queries;
      determining a global meaning or popular meaning of each of the candidate queries; and
      determining a difference between the local meaning and the global meaning or popular meaning of each of the candidate queries.

8. The method recited in claim 1, further comprising:
   generating the set of queries using query modeling.

9. The method recited in claim 1, further comprising:
   determining potential queries for the searchable content of the web site.

10. The method recited in claim 1, further comprising:
    performing a domain clustering for the searchable content of the web site, wherein the domain clustering comprises classifying the web site into a domain based on web site content.

11. The method recited in claim 1, further comprising:
    determining competitors for the searchable content of the web site.

12. The method recited in claim 1, further comprising:
    determining potential queries for the searchable content of the web site; and
    performing a domain clustering for the searchable content of the web site, wherein the domain clustering comprises classifying the web site into a domain based on web site content, wherein the candidate queries are a subset of the potential queries based on the domain clustering for the searchable content of the web site.

13. The method recited in claim 1, further comprising:
    determining a score for each of the candidate queries, wherein the score is used for ranking each of the candidate queries.

14. The method recited in claim 1, further comprising:
    determining potential queries for the searchable content of the web site, wherein the determining potential queries comprises querying a search engine log to identify the potential queries relevant to the web site comprising the searchable content;
    performing a domain clustering for the searchable content of the web site, wherein the domain clustering comprises classifying the web site into a domain based on web site content, wherein the candidate queries are a subset of the potential queries based on the domain clustering for the searchable content; and
    determining a score for each of the candidate queries, wherein the score is used for ranking each of the candidate queries.

15. The method recited in claim 1, wherein the modifying the web site further comprises:
    populating one or more queries of the set of queries in a widget on a web page of the web site, wherein the web page includes at least a subset of the searchable content of the web site, and wherein the one or more queries of the set of queries in the widget on the web page are searchable content of the web page.

16. A system for query generation for searchable content, comprising:
    a processor configured to:
       receive an identifier for a web site comprising searchable content, wherein the searchable content includes one or more web pages of the web site, and wherein the web site is to be modified for higher rankings in organic search results of a search engine;
       generate a set of queries for the web site using an inverse search engine, wherein the generated set of queries includes one or more queries that are relevant to the searchable content of the web site, wherein the generating the set of queries comprises:
          determine candidate queries for the searchable content of the web site; and
          determine a relevance for each of the candidate queries; and
       modify the web site for organic searches using the generated set of queries to generate a modified version of the web site; and
    a memory coupled to the processor and configured to provide the processor with instructions.

17. The system recited in claim 16, wherein the identifier for the web site includes a Uniform Resource Locator (URL) for the web site.

18. The system recited in claim 16, wherein the searchable content of the web site is received as an input to the inverse search engine, the generated set of queries includes ranked queries, and the generated set of queries including the ranked queries is provided as an output from the inverse search engine.

19. The system recited in claim 16, wherein the determining the relevance is based on a number of terms of each candidate query present in a web page of the web site.

20. The system recited in claim 16, wherein the searchable content of the web site is received as an input to the inverse search engine, and the generated set of queries is provided as an output from the inverse search engine.

21. The system recited in claim 16, wherein the processor is further configured to:
    performing a feedback loop to determine whether the modified version of the web site is resulting in higher rankings in organic search results of the search engine.

22. The system recited in claim 16, wherein the generating the set of queries further comprises:
    determine a topicality for each of the candidate queries.

23. The system recited in claim 16, wherein the generating the set of queries further comprises:
    determine a topicality for each of the candidate queries, wherein the determining of the topicality for each of the candidate queries comprises:
       determine a local meaning of each of the candidate queries;
       determine a global meaning or popular meaning of each of the candidate queries; and
    determine a difference between the local meaning and the global meaning or popular meaning of each of the candidate queries.

24. The system recited in claim 16, wherein the processor is further configured to:
    generate the set of queries using query modeling.

25. The system recited in claim 16, wherein the processor is further configured to:
    determine potential queries for the searchable content of the web site.

26. The system recited in claim 16, wherein the processor is further configured to:

perform a domain clustering for the searchable content of the web site, wherein the domain clustering comprises classifying the web site into a domain based on web site content.

27. The system recited in claim 16, wherein the processor is further configured to:
determine competitors for the searchable content of the web site.

28. The system recited in claim 16, wherein the processor is further configured to:
determine potential queries for the searchable content of the web site; and
perform a domain clustering for the searchable content of the web site, wherein the domain clustering comprises classifying the web site into a domain based on web site content, wherein the candidate queries are a subset of the potential queries based on the domain clustering for the searchable content of the web site.

29. The system recited in claim 16, wherein the processor is further configured to:
determine a score for each of the candidate queries, wherein the score is used for ranking each of the candidate queries.

30. The system recited in claim 16, wherein the processor is further configured to:
determine potential queries for the searchable content of the web site, wherein the determining potential queries comprises querying a search engine log to identify the potential queries relevant to the web site comprising the searchable content;
perform a domain clustering for the searchable content of the web site, wherein the domain clustering comprises classifying the web site into a domain based on web site content, wherein the candidate queries are a subset of the potential queries based on the domain clustering for the searchable content; and
determine a score for each of the candidate queries, wherein the score is used for ranking each of the candidate queries.

31. The system recited in claim 16, wherein the modifying the web site further comprises:
populating one or more queries of the set of queries in a widget on a web page of the web site, wherein the web page includes at least a subset of the searchable content of the web site, and wherein the one or more queries of the set of queries in the widget on the web page are searchable content of the web page.

32. A computer program product for query generation for searchable content, the computer program product being embodied in a tangible, non-transitory computer readable storage medium and comprising computer instructions for:
receiving an identifier for a web site comprising searchable content, wherein the searchable content includes one or more web pages of the web site, and wherein the web site is to be modified for higher rankings in organic search results of a search engine;
generating a set of queries for the web site using an inverse search engine, wherein the generated set of queries includes one or more queries that are relevant to the searchable content of the web site, wherein the generating the set of queries comprises:
determining candidate queries for the searchable content of the web site; and
determining a relevance for each of the candidate queries; and
modifying the web site for organic searches using the generated set of queries to generate a modified version of the web site.

33. The computer program product recited in claim 32, wherein the identifier for the web site includes a Uniform Resource Locator (URL) for the web site.

34. The computer program product recited in claim 32, wherein the searchable content of the web site is received as an input to the inverse search engine, the generated set of queries includes ranked queries, and the generated set of queries including the ranked queries is provided as an output from the inverse search engine.

35. The computer program product recited in claim 32, wherein the modifying the web site further comprises:
populating one or more queries of the set of queries in a widget on a web page of the web site, wherein the web page includes at least a subset of the searchable content of the web site, and wherein the one or more queries of the set of queries in the widget on the web page are searchable content of the web page.

36. A system for query generation for searchable content, comprising:
a processor configured to:
receive an identifier for a web site comprising searchable content, wherein the searchable content includes one or more web pages of the web site, and wherein the web site is to be modified for higher rankings in organic search results of a search engine;
generate a set of queries for the web site using an inverse search engine, wherein the generated set of queries includes one or more queries that are relevant to the searchable content of the web site; and
modify the web site for organic searches using the generated set of queries to generate a modified version of the web site, wherein the modifying the web site for organic searches comprises populating one or more queries of the set of queries as static content and/or dynamic content on a web page of the web site, wherein the web page includes at least a subset of the searchable content of the web site, and wherein the one or more queries of the set of queries populated on the web page are searchable content of the web page; and
a memory coupled to the processor and configured to provide the processor with instructions.

37. The system recited in claim 36, wherein the processor is further configured to:
perform a feedback loop to determine whether the modified version of the web site is resulting in higher rankings in organic search results of the search engine.

38. The system recited in claim 36, wherein the populating one or more queries of the set of queries as static content and/or dynamic content on the web page of the web site further comprises:
populate one or more queries of the set of queries in a widget on the web page of the web site, wherein the one or more queries of the set of queries populated in the widget on the web page are searchable content of the web page.

* * * * *

UNITED STATES PATENT AND TRADEMARK OFFICE
CERTIFICATE OF CORRECTION

PATENT NO. : 9,317,611 B2
APPLICATION NO. : 14/566516
DATED : April 19, 2016
INVENTOR(S) : De Datta et al.

It is certified that error appears in the above-identified patent and that said Letters Patent is hereby corrected as shown below:

Claims

In column 10, line 64, claim 5, after "recited in", delete "claim 2" and insert --claim 1--, therefor.

Signed and Sealed this
Twenty-third Day of August, 2016

Michelle K. Lee
*Director of the United States Patent and Trademark Office*